United States Patent [19]

Matsumura et al.

[11] Patent Number: 4,650,728
[45] Date of Patent: Mar. 17, 1987

[54] FUEL-CELL POWER PLANT

[75] Inventors: Mitsuie Matsumura; Tatsunori Okada; Yoshihide Gonjo, all of Amagasaki, Japan

[73] Assignee: Mitsubishi Denki Kabushiki Kaisha, Tokyo, Japan

[21] Appl. No.: 826,185

[22] Filed: Feb. 5, 1986

[30] Foreign Application Priority Data

Feb. 20, 1985 [JP] Japan ................................. 60-30606

[51] Int. Cl.⁴ ............................................ H01M 8/06
[52] U.S. Cl. ......................................... 429/19; 429/17; 429/26
[58] Field of Search .................... 429/17, 19, 20, 22, 429/24, 26, 13, 25, 34

[56] References Cited

U.S. PATENT DOCUMENTS

| 3,488,226 | 1/1970 | Baker et al. | 429/16 |
|---|---|---|---|
| 3,615,839 | 10/1971 | Thompson et al. | 429/16 |
| 4,046,956 | 9/1977 | Fanciullo | 429/24 X |
| 4,098,960 | 7/1978 | Gagnon | 429/25 |
| 4,182,795 | 1/1980 | Baker et al. | 429/13 |
| 4,192,906 | 3/1980 | Maru | 429/24 X |
| 4,202,933 | 5/1980 | Reiser et al. | 429/17 X |
| 4,310,604 | 1/1982 | Marchetti | 429/24 X |

Primary Examiner—Anthony Skapars
Attorney, Agent, or Firm—Leydig, Voit & Mayer

[57] ABSTRACT

In a fuel-cell power plant according to this invention, a fuel gas system for supplying a fuel gas to an internal reforming type fuel cell is furnished with a fuel processor, fuel containing hydrocarbon or alcohols as its principal ingredient and supplied externally is partly or wholly passed through the fuel processor, and a fuel gas containing hydrogen and generated in the fuel processor is supplied to the internal reforming type fuel cell.

20 Claims, 4 Drawing Figures

FIG. I
PRIOR ART

FUEL-CELL POWER PLANT

BACKGROUND OF THE INVENTION

This invention relates to fuel-cell power plants, and more particularly to a fuel-cell power plant which employs an internal reforming type fuel cell.

FIG. 1 shows a prior-art power plant which employs an internal-reforming molten-carbonate type fuel cell. Referring to the figure, numeral 1 designates an internal-reforming molten-carbonate type fuel cell (hereinbelow, simply termed "fuel cell") which is made up of one or more laminated cell structures. A combustor 2 serves to oxidize a fuel gas unreacted in the fuel cell 1. Hezt exchangers 3a and 3b serve to preheat a reaction gas which is supplied to the fuel cell 1.

Owing to the above construction, the fuel gas 7 which consists of fuel 5, containing hydrocarbon or alcohols as its principal ingredient, and steam 6 is preheated to a predetermined temperature, for example, 550° C. by the heat exchanger 3a and is thereafter supplied to the fuel cell 1. On the other hand, air 8 is mixed with an exhaust gas at the outlet of the combustor 2, the major ingredient of which is carbon dioxide perfectly oxidized by the combustor 2. The air 8 mixed with the exhaust gas is preheated by the heat exchanger 3b, and is thereafter supplied to the fuel cell 1.

Here, the fuel cell 1 uses as its fuel the fuel gas principally containing hydrocarbon or alcohols and operates at a temperature of or near 650° C. by way of example. In a gas passage and an electrode on the fuel gas side of the fuel cell 1, there are carried out chemical reactions (Formulas (1)–(4) given below) of decomposing the hydrocarbon or alcohols to produce hydrogen and an electrochemical reaction (Formula (5) given below) of consuming the hydrogen to create electricity. Besides, in an electrode on the oxidizing gas side, an electrochemical reaction (Formula (6) given below) is conducted. The fuel cell 1 converts chemical energy inherent in the fuel gas into electric energy and its attendant thermal energy as a whole.

(Gas Passage and Electrode on Fuel Gas Side)

Hydrocarbon + H₂O → H₂, CO, CO₂, CH₄      (1)

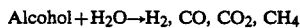

Alcohol + H₂O → H₂, CO, CO₂, CH₄      (2)

CH₄ + H₂O ⇌ CO + 3H₂      (3)

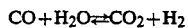

CO + H₂O ⇌ CO₂ + H₂      (4)

H₂ + CO₃²⁻ → H₂O + CO₂ + 2e (5)

(Electrode on Oxidizing Gas Side)

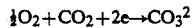

½O₂ + CO₂ + 2e → CO₃²      (6)

For the purpose of steadily decomposing the hydrocarbon or alcohols at the temperature of or near 650° C. by way of example so as to produce the hydrogen in accordance with Formulas (1)–(4), catalysts for accelerating the reactions, for example, a reforming catalyst and the heat of reactions necessary for the reactions of Formulas (1)–(4) need to be supplied. In the conventional internal-reforming molten-carbonate type fuel cell, accordingly, the steady operation thereof is made possible, for example, in such a way that the reforming catalyst is disposed within the fuel gas side gas passage and in adjacency to the electrode and that thermal energy produced accessorily in the electrochemical reactions of Formulas (5) and (6) is supplied as the heat of the reactions of Formulas (1)–(4). Therefore, it is important for operating the fuel cell 1 steadily and stably to maintain the activity of the catalyst and to supply sufficient heat of the reactions at all times.

The above catalyst exemplified as the reforming catalyst is such that an active material such as nickel is carried on a support whose principal ingredients are alumina and magnesia. For keeping the activity of this catalyst, the oxidation of the nickel or the like active material as indicated by the following formula (7) needs to be prevented:

Ni + H₂O ⇌ NiO + H₂      (7)

The conventional decomposition of hydrocarbon or alcohols/production of hydrogen employing the reforming catalyst is performed by adding steam as indicated by Formulas (1)–(4). Since the oxidation of the active material such as nickel is prevented by the produced hydrogen, the activity of the catalyst is kept. In the fuel cell 1 of this type, however, the hydrogen produced by Formulas (1)–(4) is consumed to produce steam as indicated by Formula (5). Therefore, the concentration of hydrogen lowers to incur the oxidation of the active material, e.g., nickel of the catalyst, so that the activity of the catalyst is prone to lower. Such a tendency of the active material toward the oxidation differs depending upon the kind of the active material. As to the catalyst employing nickel as the active material, it is known as one criterion that when the ratio of the water vapor concentration to the hydrogen concentration becomes 10–20 or above, the oxidation of the nickel takes place to lower the activity of the catalyst. In order to keep the activity of the catalyst, accordingly, the ratio of the water vapor concentration to the hydrogen concentration needs to be held at or below a certain value (for example, at or below 10–20). As illustrated in FIG. 1, in the prior-art fuel-cell power plant, hydrogen is not included in the fuel gas 7 which is supplied to the fuel cell 1. Accordingly, in a case where the electrochemical reaction of Formula (5) is excessively conducted, that is, in a case where current is derived from the fuel cell 1 in large quantities, the hydrogen concentration lowers in the fuel gas passage especially at an inlet part for the fuel gas, and the activity of the catalyst disposed in the fuel gas passage lowers, so that the power plant cannot be continuously operated.

In general, the fuel cell 1 has the property that in case of diminishing the amount of current to be derived, cell characteristics are enhanced, in other words, the proportion of conversion of the chemical energy into the electric energy increases, whereas the occupying proportion of the thermal energy to be accessorily produced decreases. Accordingly, in the case where the amount of current to be derived is diminished, the proportion of the decrease of the thermal energy to be accessorily produced by the electrochemical reactions (Formulas (5) and (6)) becomes greater than the decrease of the heat of the reactions required for the decomposition of the hydrocarbon or alcohols (Formulas (1)–(4)). This results in the situation that the heat of the reactions necessary for the decomposition of the hydrocarbon or alcohols is insufficient, so the power plant cannot be operated with a light load for a long time.

With the prior-art fuel-cell power plant as described above, the operation of the fuel cell under a high load is impossible because of the lowering of the activity of the catalyst attributed to the oxidation of the active material of the catalyst. To the contrary, in case of a low load, the heat of the reactions necessary for the decomposition of the hydrocarbon or alcohols cannot be supplied by only the thermal energy accessorily produced by the fuel cell. Thus, the operable condition of the fuel-cell power plant is limited to a very narrow range. This leads to the problem that an efficient operation following a demand load, which ought to be the feature of the power plant of the specified type, cannot be stably performed for a long term.

SUMMARY OF THE INVENTION

This invention has been made in order to solve the problem as described above, and has for its object to provide a fuel-cell power plant which realizes the high load operation of a fuel cell without lowering the activity of a catalyst and which is capable of a partial load operation in a wide range.

In a fuel-cell power plant according to this invention, a fuel gas system for supplying a fuel gas to an internal reforming type fuel cell is furnished with a fuel processor, fuel containing hydrocarbon or alcohols as its principal ingredient and supplied externally is partly or wholly passed through the fuel processor, and a fuel gas containing hydrogen and generated in the fuel processor is supplied to the internal reforming type fuel cell.

BRIEF DESCRIPTION OF THE DRAWINGS

In the drawings, the same symbols indicate identical or corresponding portions.

DESCRIPTION OF THE PREFERRED EMBODIMENTS

Figure 1:
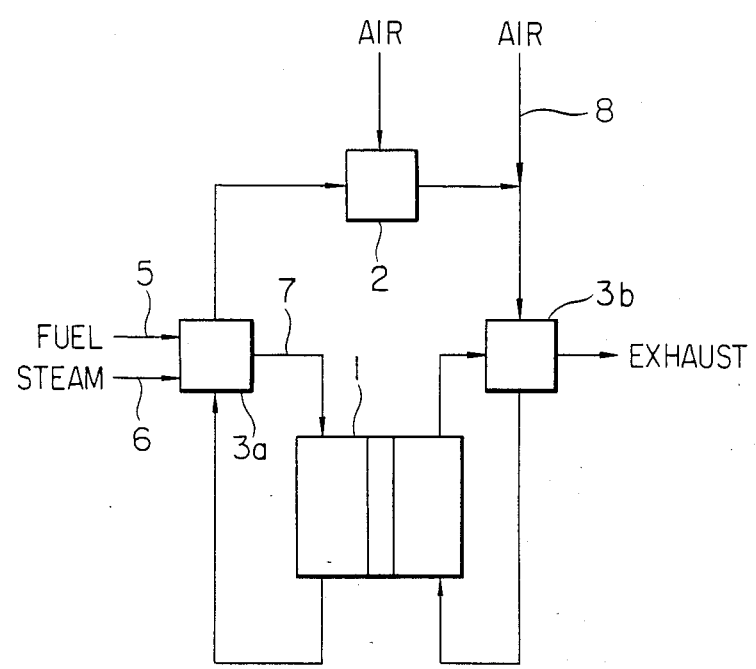
FIG. 1 is an arrangement connection diagram of a prior-art fuel-cell power plant.
Figure 2:
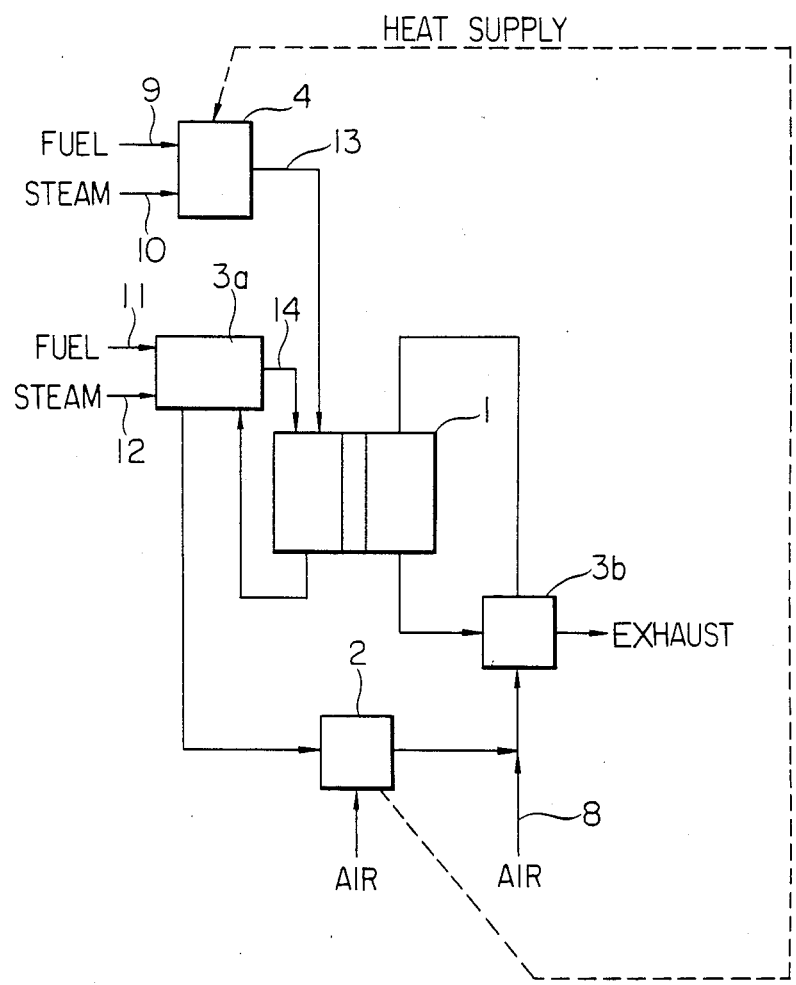
FIG. 2 is an arrangement connection diagram of a fuel-cell power plant according to an embodiment of this invention.

Now, one embodiment of this invention will be described with reference to the drawing. FIG. 2 is an arrangement connection diagram of a power plant which utilizes an internal-reforming molten-carbonate type fuel cell (fuel cell 1). In the figure, numeral 4 designates a fuel processor which is incorporated in a fuel gas system for supplying a fuel gas to the fuel cell 1. This processor is a chemical reactor in which the fuel gas containing hydrocarbon or alcohols as its major ingredient and supplied to the fuel-cell power plant is partly or wholly decomposed thereby to be modified into a fuel gas 13 containing hydrogen as its principal ingredient. Besides, the same aymbols as in FIG. 1 indicate identical portions.

Owing to the above construction, part 9 of the fuel gas principally containing the hydrocarbon or alcohols and supplied to the fuel-cell power plant is supplied to the fuel processor 4 along with steam 10 necessary for the decomposition of the fuel gas, thereby to be modified into the fuel gas 13 whose principal ingredient is hydrogen. Since the decomposition of the hydrocarbon or alcohols is an endothermic reaction, the fuel processor 4 needs to be supplied with the heat of reaction. In this fuel-cell power plant, as indicated by a broken line in FIG. 2, combustion heat inherent in a fuel side exhaust gas not utilized yet, obtained with the combustor 2 is utilized as the reaction heat necessary for the fuel processor 4. Concretely, this utilization of heat can be readily realized in such a way that the combustor 2 is disposed inside the fuel processor 4 and is used for heating or that the combusion gas at a high temperature exhausted from the combustor 2 is introduced into the fuel processor 4 and is subjected to heat exchange with the fuel gas inside the fuel processor 4.

On the other hand, the remainder 11 of the fuel gas supplied to the fuel-cell power plant is mixed with steam 12 necessary for the decomposition of the fuel gas in the fuel cell 1, and it is directly supplied to the fuel cell 1 after being preheated to an appropriate temperature in the heat exchanger 3a.

The fuel gases 13 and 14 supplied to the fuel cell 1 and containing hydrogen, carbon monoxide, carbon dioxide, methane, steam, hydrocarbon or alcohols, etc. are consumed according to Formulas (1)–(5) in the fuel gas side gas passage and the fuel gas side electrode, to create the electric energy and the attendant thermal energy.

In the above embodiment, the hydrogen in an amount sufficient to prevent the activity of the catalyst from lowering due to the oxidation of the active material of the catalyst is already contained in the fuel gas supplied to the fuel cell 1, so that the operation of the fuel cell at a high load becomes possible. Moreover, the decomposition of the fuel gas externally supplied is partially carried out inside the fuel processor 4, thereby to reduce the reaction heat for the decomposition of the fuel gas as required in the fuel cell 1 and to permit the partial load operation of the fuel cell in a wide range.

For operating the fuel-cell power plant efficiently and effectively, it is important to adjust the ratio at which the fuel supplied from outside is distributed as the fuel 9 and as the fuel 11. In case of increasing the proportion of the fuel 9 to be fed to the fuel processor 4, the partial pressure of the hydrogen contained in the fuel gas to be supplied to the fuel cell 1 increases, which is desirable from the aspect of the stability of the activity of the catalyst disposed inside the fuel cell. From the viewpoint of the balance between the reaction heat necessary for the fuel gas in the fuel cell 1 and the heat accessorily produced by the electrochemical reactions, no problem is posed under the rated load of the fuel cell because the heat accessorily produced is ordinarily in excess of the required reaction heat. In contrast, as the load of the fuel cell is lowered, the balance between the accessorily produced heat and the reaction heat collapses, and as the partial load factor is lowered more, the difference between them expands more. In this case, therefore, the proportion of the fuel 9 to be fed to the fuel processor 4 needs to be enlarged.

One of the merits of the fuel cell 1 of this type is that the fuel gas is decomposed within the fuel cell, whereby the heat accessorily produced by the electrochemical reactions is efficiently utilized as the reaction heat of the decomposition of the fuel gas, while at the same time the cooling load of the fuel cell is relieved. Besides, an independent fuel processor is not required outside. It is accordingly possible to enhance the efficiency of the power plant and to miniaturize the plant.

In the fuel-cell power plant, the proportion of the fuel 9 to be fed to the fuel processor 4 should desirably be minimized from the viewpoint of exploiting the merits of the fuel cell 1 to the utmost. Thus, the fuel-cell power plant is permitted to operate stably for a long term.

Such a proportion of the fuel 9 relative to the whole fuel supplied changes depending upon the operating condition, the partial load factor, etc. of the fuel-cell power plant. By way of example, in a case where the average current density of the fuel cell in the rated operation is 160 mA/cm$^2$, where the hydrocarbon being the fuel is methane and where the steam-to-methane ratio is 3.0, approximately 3–30% is appropriate as the proportion of the fuel 9 relative to the whole fuel supplied.

While the above embodiment has referred to the case of employing the internal-reforming molten-carbonate type fuel cell, a different kind of internally-reforming fuel cell may well be employed, and effects similar to those of the embodiment are achieved.

The above embodiment has referred to the case where the reaction heat required for the fuel processor 4 is supplied by the combustion heat generated in the combustor 2. However, the reaction heat to be supplied may well be sensible heat inherent in the fuel gas or oxidizing gas of high temperature discharged from the internal reforming type fuel cell, or it may well be any other waste heat obtained in the fuel-cell power plant. Alternatively, fuel supplied anew from outside may well be burnt within the fuel processor 4 so as to use the combustion heat thereof as the aforementioned reaction heat.

Figure 3:
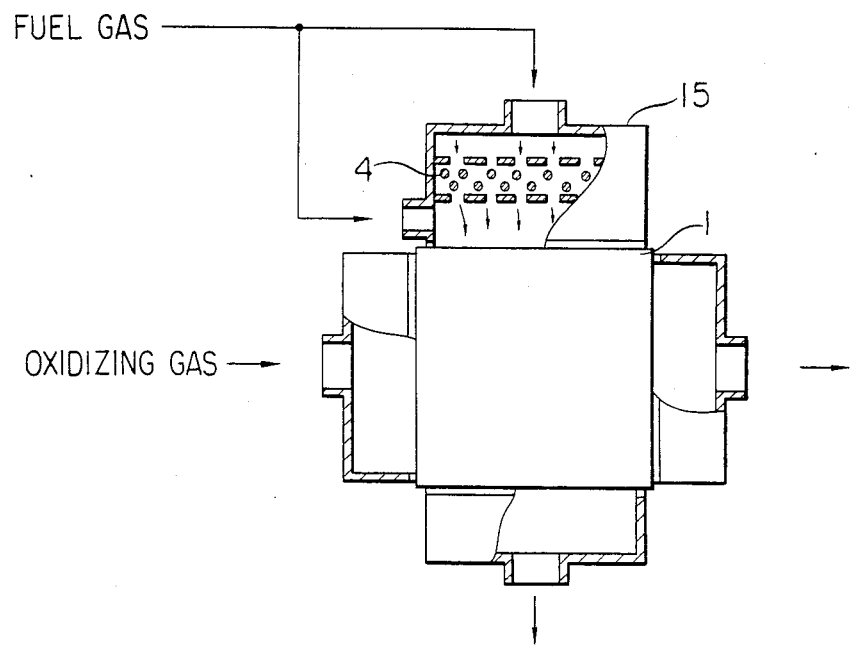
FIGS. 3 and 4 are side views, partially in section, each showing the essential portions of a fuel-cell power plant according to another embodiment.

Further, while the above embodiment has illustrated the example in which the independent reactor is disposed as the fuel processor, the fuel cell and the fuel processor may well be unitarily constructed by disposing the latter in a gas manifold for supplying or discharging the fuel gas or oxidizing gas to or from the former. As a concrete example, FIG. 3 shows another embodiment in which the fuel processor 4 is disposed within a fuel gas inlet manifold 15. In this case, the fuel processor 4 is supplied with the reaction heat by the heat of radiation from the side surface of the fuel cell 1.

Figure 4:
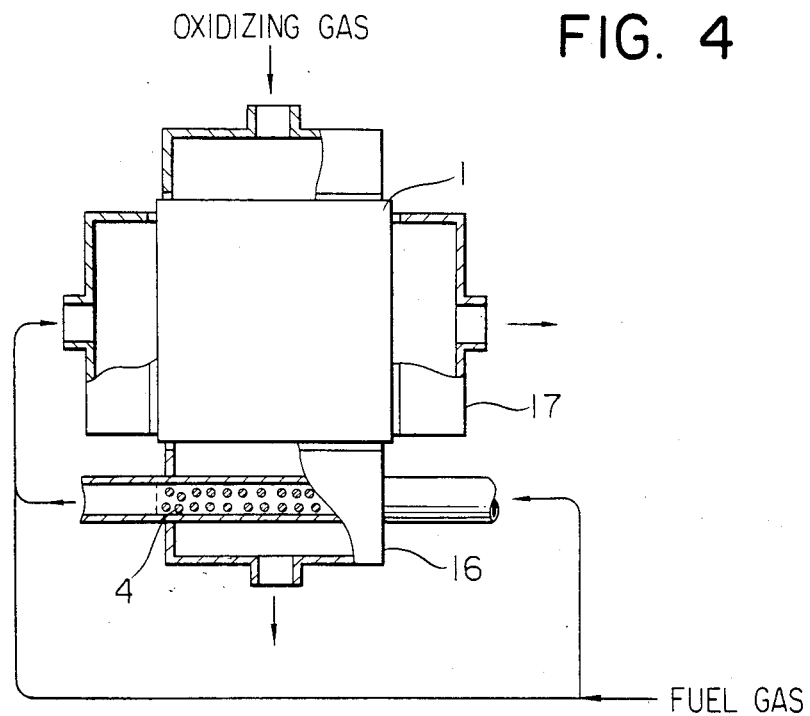

FIG. 4 shows still another embodiment in which the fuel processor 4 is disposed within an oxidizing gas outlet manifold 16. In this case, the fuel processor 4 is heated by the heat of radiation from the side surface of the fuel cell 1 and the oxidizing gas of high temperature discharged from the fuel cell 1. The fuel processor 4 may well be disposed within a fuel gas outlet manifold 17, and similar effects are achieved.

As apparent from the above description, this invention consists in that a fuel gas system for supplying a fuel gas to an internal reforming type fuel cell is furnished with a fuel processor and that a fuel gas supplied from outside is previously decomposed into hydrogen at least partly and is thereafter supplied to the internal reforming type fuel cell. Accordingly, this invention brings forth the effects that the high load operation of the internal reforming type fuel cell which is stable over a long term is permitted and that even in case of a low load, the thermal balance of the internal reforming type fuel cell does not collapse, so the load following-up property is good as s whole, and the reliability can be enhanced.

What is claimed is:

1. A fuel-cell power plant comprising an internal reforming type fuel cell in which chemical reactions and electrochemical reactions are carried out with a fuel gas supplied from a fuel gas system and an oxidizing gas supplied from an oxidizing gas system, and a fuel processor which is supplied with reaction heat and which modifies the fuel gas into a gas containing hydrogen as its principal ingredient, so as to supply the modified gas to a fuel gas system of said internal reforming type fuel cell.

2. A fuel-cell power plant according to claim 1, wherein said fuel processor is supplied with part of the fuel gas supplied from outside, and said internal reforming type fuel cell is supplied with the gas containing hydrogen as its principal ingredient as modified by said fuel processor, along with the remainder of the fuel gas.

3. A fuel-cell power plant according to claim 1 wherein said internal reforming type fuel cell is an internal-reforming molten-carbonate type fuel cell.

4. A fuel-cell power plant according to claim 1 wherein the fuel gas is a member selected from the group consisting of hydrocarbon and alcohols.

5. A fuel-cell power plant according to claim 1, wherein the reaction heat which is supplied to said fuel processor is combustion heat of the fuel gas not utilized yet, which is discharged from said internal reforming type fuel cell.

6. A fuel-cell power plant according to claim 1, wherein the reaction heat which is supplied to said fuel processor is sensible heat of at least one of the fuel gas and the oxidizing gas which are discharged from said internal reforming type fuel cell.

7. A fuel-cell power plant according to claim 1, wherein said fuel processor is disposed in a fuel gas inlet manifold, or a fuel gas outlet manifold, an oxidizing gas inlet manifold or an oxidizing gas outlet manifold of said internal reforming type fuel cell.

8. A fuel-cell power plant according to claim 2, wherein said internal reforming type fuel cell is an internal-reforming molten-carbonate type fuel cell.

9. A fuel-cell power plant according to claim 2, wherein the fuel gas is a member selected from the group consisting of hydrocarbon and alcohols.

10. A fuel-cell power plant according to claim 3, wherein the fuel gas is a member selected from the group consisting of hydrogen and alcohols.

11. A fuel-cell power plant according to claim 2, wherein the reaction heat which is supplied to said fuel processor is combustion heat of the fuel gas not utilized yet, which is discharged from said internal reforming type fuel cell.

12. A fuel-cell power plant according to claim 3, wherein the reaction heat which is supplied to said fuel processor is combustion heat of the fuel gas not utilized yet, which is discharged from said internal reforming type fuel cell.

13. A fuel-cell power plant according to claim 4, wherein the reaction heat which is supplied to said fuel processor is combustion heat of the fuel gas not utilized yet, which is discharged form said internal reforming type fuel cell.

14. A fuel-cell power plant according to claim 2, wherein the reaction heat which is supplied to said fuel processor is sensible heat of at least one of the fuel gas and the oxidizing gas which are discharged from said internal reforming type fuel cell.

15. A fuel-cell power plant according to claim 3, wherein the reaction heat which is supplied to said fuel processor is sensible heat of at least one of the fuel gas and the oxidizing gas which are discharged from said internal reforming type fuel cell.

16. A fuel-cell power plant according to claim 4, wherein the reaction heat which is supplied to said fuel processor is sensible heat of at least one of the fuel gas and the oxidizing gas which are discharged from said internal reforming type fuel cell.

17. A fuel-cell power plant according to claim 5, wherein the reaction heat which is supplied to said fuel processor is sensible heat of at least one of the fuel gas and the oxidizing gas which are discharged from said internal reforming type fuel cell.

18. A fuel-cell power plant according to claim 2, wherein said fuel processor is disposed in a fuel gas inlet manifold, or a fuel gas outlet manifold, or an oxidizing gas inlet manifold or an oxidizing gas outlet manifold of said internal reforming type fuel cell.

19. A fuel-cell power plant according to claim 3, wherein said fuel processor is disposed in a fuel gas inlet manifold, or a fuel gas outlet manifold, or an oxidizing gas inlet manifold or an oxidizing gas outlet manifold of said internal reforming type fuel cell.

20. A fuel-cell power plant according to claim 4, wherein said fuel processor is disposed in a fuel gas inlet manifold, or a fuel gas outlet manifold, or an oxidizing gas inlet manifold or an oxidizing gas outlet manifold of said internal reforming type fuel cell.

* * * * *